C. DENTON.
HARVESTER-REEL ADJUSTMENT.
No. 194,898. Patented Sept. 4, 1877.
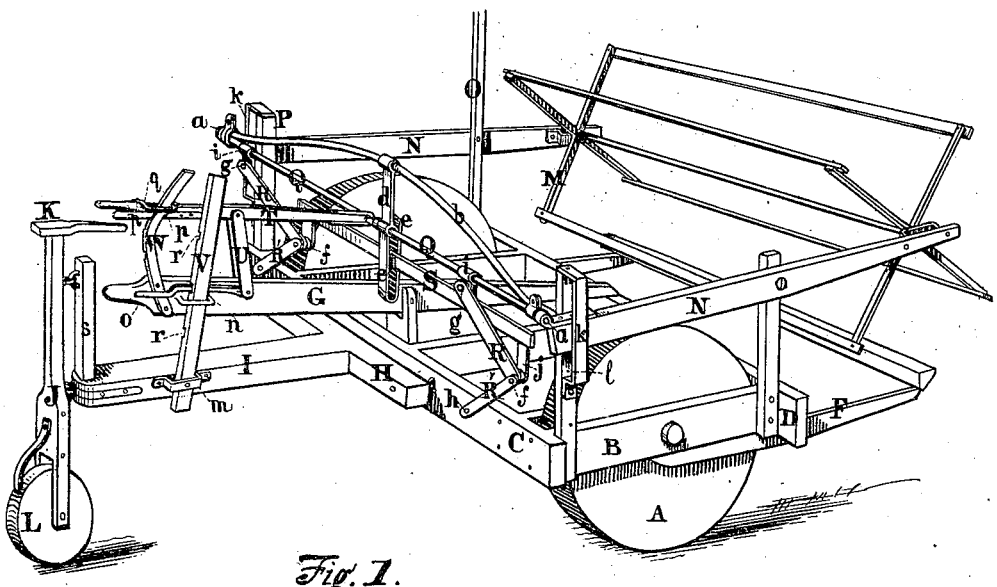
Fig. 1.
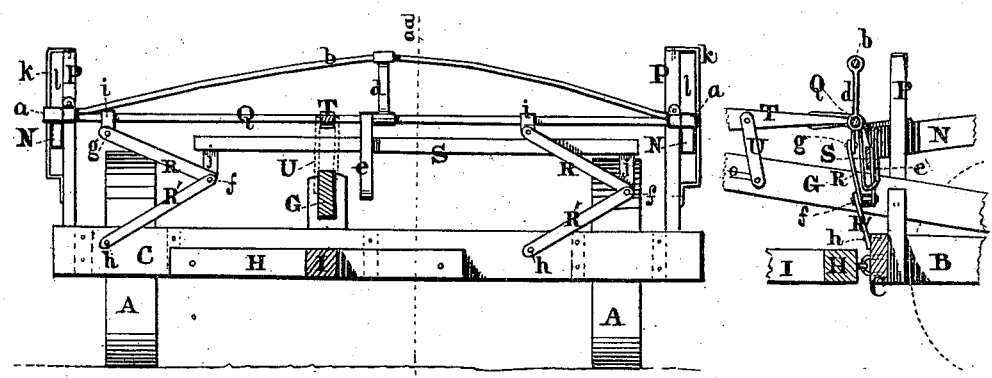
Fig. 2.
Rear elevation; the Tongue, Frame lever, & Reel lever seen in sec.
Fig. 3.
Vert. sec. on line a.a. fig. 2 (seen from the Right of fig. 2.)
Witnesses
Jno. D. Patten
Robert E. Frantz
Charles Denton
by E. Thurlow,
his atty. in fact.

UNITED STATES PATENT OFFICE.

CHARLES DENTON, OF PEKIN, ILLINOIS, (CAROLINE L. DENTON, EXECUTRIX OF ESTATE OF CHARLES DENTON, DECEASED, ASSIGNOR TO ANDREW J. HODGES, OF PEORIA, ILLINOIS.)

IMPROVEMENT IN HARVESTER-REEL ADJUSTMENTS.

Specification forming part of Letters Patent No. 194,898, dated September 4, 1877; application filed June 22, 1876.

*To all whom it may concern:*

Be it known that I, CHARLES DENTON, of the city of Pekin, in the county of Tazewell, in the State of Illinois, have invented an Improvement in Reel-Adjusting Mechanism for Headers or Harvesters; and do hereby declare that the following is a full, clear, and exact description thereof, reference being had to the annexed drawings, making a part of this specification, in which like letters of reference refer to like parts, and in which—

Figure 1 represents a perspective view; Fig. 2, a rear elevation, (the tongue, frame-lever, and reel-lever being seen in section only;) Fig. 3, a vertical longitudinal section on line $a\,a$, Fig. 2, (seen from the right of Fig. 2.)

This improvement relates to the use of parallel bars united by links to connect the pivoted reel-bars with the wheel-frame, for the purpose of obtaining a perfectly equal elevation or lowering of the rear ends of said reel-bars when adjusting the distance of the reel from the sickle-bar in raising or lowering the latter or its attached reaping-platform.

In the drawings, which represent one of the forms in which I construct this machine, A A are the wheels; B, the side beams of the wheel-frame; C, rear beam, and D front beam, of said frame; F, the reaping-platform; G, main lever of the reaping-platform; H, the cross-head of the tongue I, jointed in the usual manner to the wheel-frame; J K, steering apparatus; M, reel; N N, reel bars or bearers, pivoted near their centers on supports O O. P P are guides erected on each side of the wheel-frame, provided with slots $l\,l$ to confine the rear ends of the reel-bars to a vertical motion. Q represents a horizontal bar connecting and pivoted at each end to the respective reel-bars, strengthened by a brace, $d$, and stay-rod $b$. A vertical guide, $e$, descends from said bar Q, to preserve the vertical movement of the bar S. R R are links, respectively attached to fixed pivots $g\,g$ at each end of said bar, each descending parallel to the other, and pivoted at $ff$ to the second parallel bar, S, employed to preserve the equidistance of the latter joints, $ff$, or respective elbow-joints formed by the junction of the respective links R R'. The lower links R' R' of said joint are of equal length with the upper ones, and are each pivoted to the rear beam C of the frame, each below the respective upper pivots $g\,g$ of the links R R to the upper bar.

T represents a lever, attached in front to the middle of the bar Q, (it may be attached with equal effect to the bar S,) pivoted near its middle to the links U U rising from pivots on the main lever G. Said lever T has a spring-detent, $p$, engaging with recesses in the segmental stay W rising from said lever G. V represents the detent for the catch $o$ of main lever.

The operation of this reel-adjuster is as follows: The object being to adjust the distance between the reel and the cutting-platform according to requirements, and at the same time to balance the weight of the reel by pivoting the reel-bearing bars N N in such manner as to equalize the weight of the reel and adjusting apparatus effectually, the reel-bars are caused to rise simultaneously at the same level by means of the parallel-motion bars Q S and their elbow-joints R R R' R' and said lever T.

What I claim as my invention is—

The reel, adjustable by means of double-jointed braces and parallel bars, in combination with the reel-arms and operating-lever, substantially as described.

In testimony that I claim the foregoing reel-adjusting devices for harvesters I have hereunto set my hand this 30th day of May, A. D. 1876.

CHARLES DENTON.

Witnesses:
W. A. TINNEY,
JOHN V. MARSHALL.